T. A. EMMONS.
Loom-Harness.
No. 202,339.  Patented April 16, 1878.
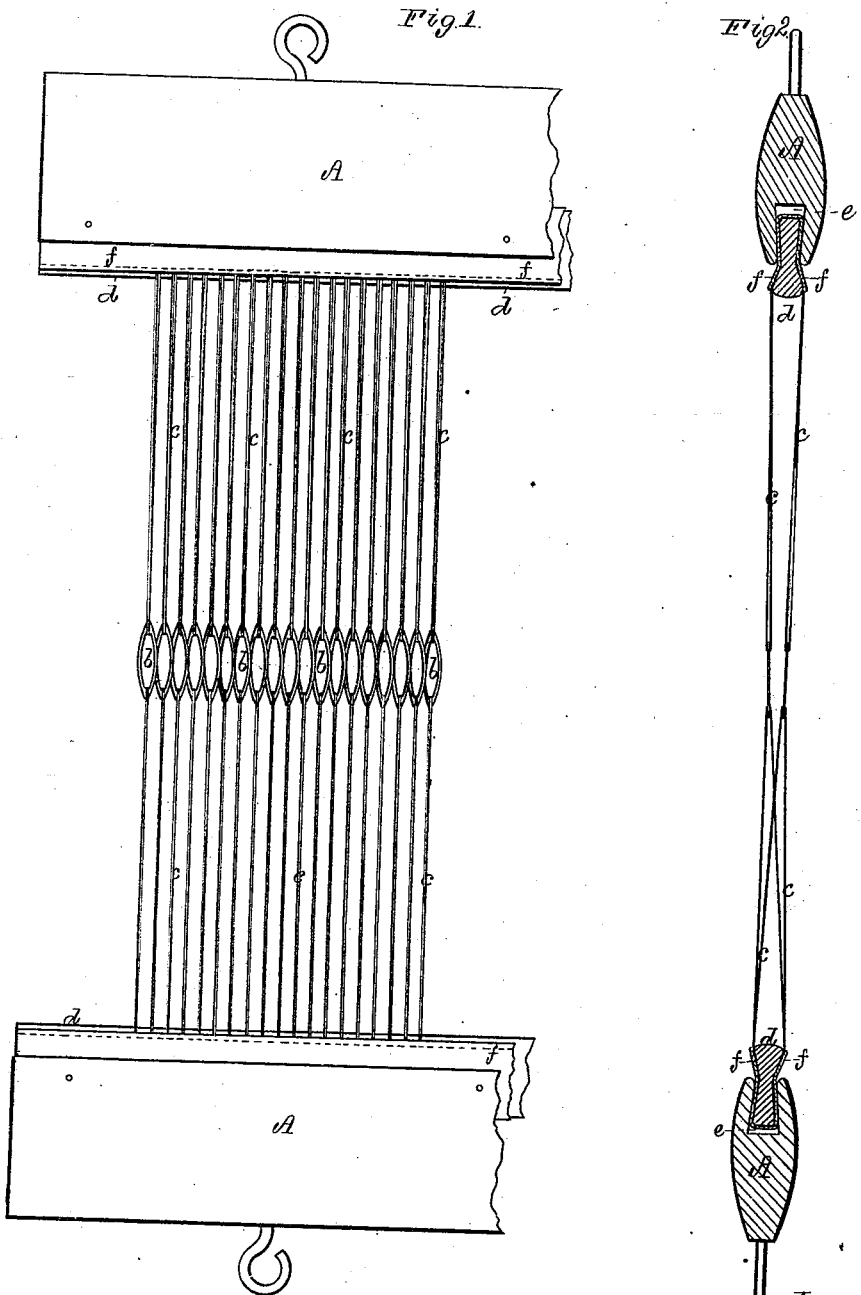

UNITED STATES PATENT OFFICE.

THOMAS A. EMMONS, OF LAWRENCE, MASSACHUSETTS.

IMPROVEMENT IN LOOM-HARNESSES.

Specification forming part of Letters Patent No. 202,339, dated April 16, 1878; application filed April 30, 1877.

*To all whom it may concern:*

Be it known that I, THOMAS A. EMMONS, of Lawrence, of the county of Essex and State of Massachusetts, have invented a new and useful Improvement in Loom-Harness; and do hereby declare the same to be described in the following specification and represented in the accompanying drawings, of which—

Figure 1 denotes a front elevation, and Fig. 2 a vertical and transverse section, of a loom-harness embracing my invention.

The twines $c$ for supporting the eyes are looped around two auxiliary shafts or bars, $d$ $d$, each of which is dovetailed in transverse section, as represented, and is arranged and fitted within a corresponding dovetail groove, $e$, in one of the main shafts or bars, A A, all being as shown. Before inserting the bar $d$ within the groove, there is to be placed in the latter or on the loops of the bar $c$ a strip, $f$, of cloth, which should extend partially around the auxiliary bar and its loops, and project from the groove a short distance on each side of such auxiliary bar, all being in manner as shown. When the harness may be in use, the draft of the main or channeled bars upon the auxiliary or loop-holding bars will tighten the harness and cause the strips of cloth to be firmly held in their places.

These strips are to enable a person to repair the harness when any twine of it may become broken, such being done by affixing the broken twine or a substitute therefor to the projecting part or parts of the cloth. By having the loops confined within the main bars in manner as described, instead of being carried about them, as they are usually, such loops are not so liable to become worn, and, besides, they are not spread apart by the shanks of the eyes of the bars. Furthermore, a better finish is made to the harness.

I claim—

In combination with the main and auxiliary harness, supporting-bars A $d$, arranged and having the twines disposed with them as described, the strips $f$ of cloth placed in or applied to the main bars A and adapted to extend therefrom, substantially in manner and for the purpose as set forth.

THOMAS A. EMMONS.

Witnesses:
 R. H. EDDY,
 J. R. SNOW.